United States Patent [19]

Siegel

[11] Patent Number: 4,544,638
[45] Date of Patent: Oct. 1, 1985

[54] SYNTHESIS OF CROSS-LINKS IN THE HELICAL DOMAIN OF COLLAGEN USING PYRIDOXAL 5-PHOSPHATE AND COPPER OR IRON

[75] Inventor: Robert C. Siegel, Hillsborough, Calif.

[73] Assignee: The Regents of the University of California, Berkeley, Calif.

[21] Appl. No.: 611,909

[22] Filed: May 18, 1984

[51] Int. Cl.[4] .................. C07G 7/00; C08H 1/06; C08L 89/06; C09H 7/00
[52] U.S. Cl. .................. 435/273; 260/113; 260/115; 260/123.7; 435/69
[58] Field of Search ............ 260/123.7, 113, 115; 435/69, 273

[56] References Cited

U.S. PATENT DOCUMENTS

| | | | |
|---|---|---|---|
| 3,131,130 | 4/1964 | Oneson | 435/273 |
| 3,530,037 | 9/1970 | Nishihara | 435/273 |
| 4,193,813 | 3/1980 | Chuapil | 260/123.7 X |
| 4,233,360 | 11/1980 | Luck et al. | 260/123.7 X |
| 4,260,228 | 4/1981 | Miyata | 260/123.7 X |
| 4,271,070 | 6/1981 | Miyata et al. | 260/123.7 |

OTHER PUBLICATIONS

Biochemical and Biophysical Research Communications, 33, No. 5 (1968), 752–757, Page et al.
Dissertation Abstracts, B, Jun., 1969, vol. 29, No. 12, Part 1, 4507–B, Chou.
Analytical Biochemistry, 115, 18–26 (1981), Birkedal–Hansen et al.

*Primary Examiner*—Howard E. Schain
*Attorney, Agent, or Firm*—Phillips, Moore, Lempip & Finley

[57] ABSTRACT

Aldehyde cross-link intermediates and cross-links are generated in the central helical portion of collagen by incubating collagen with pyridoxal-5-phosphate and either cupric copper ion or ferrous iron ion. The cross-links are chemically similar to natural cross-links found in the non-helical regions and are directly between amino-acid moieties naturally occuring in the central helical portion of collagen. Cross-linking and utilization of aldehyde intermediates occurs when the product is reincubated after pyridoxal is removed. Alternatively maintaining the product at body temperatures will promote cross-linking. The cross-linked collagen product has increased resistance to enzyme degradation.

18 Claims, 6 Drawing Figures

SYNTHESIS OF CROSS-LINKS IN THE HELICAL DOMAIN OF COLLAGEN USING PYRIDOXAL 5-PHOSPHATE AND COPPER OR IRON

BACKGROUND OF THE INVENTION

Collagen is a protein comprising the major fibrous element of mammalian skin, bone, tendon, cartilage, blood vessels, and teeth. Its biological purpose is to hold cells together in discrete units; and secondarily it has a directive role in developing tissues. In mammals, collagen is the principal protein and comprises ten percent of the total protein content of the body.

The collagen proteins are distinctive in their physical characteristics in that they form insoluble fibers possessing high tensile strength. It is the fibrous nature of the collagen that serves to hold the various body structures and components together. In fact, the word "collagen" is derived from the Greek words meaning "to produce glue". Thus collagen is a vitally important biological protein.

While the molecular structure is modified to meet the needs of particular tissues, all collagens are organized into a common structure consisting of three polypeptide chains that form a triple stranded helix. These triple stranded helical units, in turn, are formed into a quarter-staggered array of linearly aligned bundles which make up collagen fibers. The collagen fibers are stabilized by covalent cross-links. Two kinds of cross links are formed, those which are intramolecular between the helically stranded polypeptide chains; and those which are intermolecular between different helical units.

These cross-links principally occur in the non-helical ends of the peptide chains wherever lysine, or hydroxylysine amino acid residues occur. Such cross-links are generated between the lysine or hydroxylysine residues through either an aldol condensation or Schiff base reaction. In the first type of reaction the $\epsilon$-amino group of a lysyl residue is converted into aldehyde by the enzyme, lysyl oxidase. If sufficiently adjacent one another, two such aldehydes undergo an aldol condensation to form an aldol condensation product. In the second type of reaction, aldehydes derived from lysyl or hydroxylysyl groups can also condense with the $\epsilon$-aminogroup of lysyl or hydroylysyl residues to form Shiff base cross-links.

In some instances the aldol-lysine cross-links can react with a histidine side chain to form an histidine-aldol cross-link. In other instances, the aldehyde group in the histidine-aldol cross-link can, in turn, form a Schiff base with yet another side chain, e.g., hydroxylysine. By such cross-linking reactions, four side chains and two or more molecules can be covalently bonded together.

It has been shown that purified collagen can be utilized medically in reconstructive and cosmetic surgery for the replacement of bony structures or gaps in bony structures, and for filling out tissues where wrinkles have formed. In such usage, collagen is secured from mammalian sources, e.g., calves, and extraneous proteinaceous material is removed by various dissolution, precipitation and filtration techniques to leave a pure collagenous product. Native collagen has limited clinical usefulness since it may induce antigenic response in the host subject. Such response is generated principally by the non-helical terminal portions of the collagen molecule. These end regions can be cleaved by treatment with a proteolytic enzyme, e.g. pepsin. After digestion with pepsin, the cleaved peptide ends are discarded and only the helical domain which comprises more than 95% of the molecule remains. These molecules are of low antigenicity and they can be used for the purposes noted above without undue antigenic side effects.

Unfortunately, however, the helical collagen domain contains little, if any, of the native covalent cross-links that stabilize native collagen and produce its high tensile strength as well as resistance to degradation by enzymes and resorption by body fluids. Thus, the unmodified collagen products available to the medical profession are soon subject to break-down and resorption in a host subject unless artificial, potentially antigenic cross-links are introduced.

It is therefore desirable to devise a low-antigenic collagen product that will exhibit the tensile properties of native collagen and resist degradation and resorption. One obvious technique for achieving such a desired collagen would be the induction of cross-links between various amino-acid residues occuring in the central portions of the collagen helixes. The nature of such cross-links have been noted above. However, such cross-links normally occur in those portions of the collagen that are cleaved off to yield a low-antigenic product.

Some reports have noted the induction of cross-links in the low-antigenic helical collagen by employing glutaraldehyde as an intermediate moiety in the production of cross-links between lysine residues. However, the introduction of glutaraldehyde into the collagen cross-links introduces a new antigenic determinant, and may alter certain physical properties of cross-linked fibrils in undesirable ways.

It is of considerable interest, therefore, to increase the resistance of low-antigenic collagen to degradation when emplaced within body tissues. Such improvement could be provided by inducing native-type cross-linking into the helical low antigenic domain of the collagen molecule.

BRIEF DESCRIPTION OF THE INVENTION

The present invention relates to the production of native cross-link intermediates and cross-links in the helical domain of collagen. The material in which native cross-links are induced is collagen obtained from any suitable animal source, which is purified to remove non-collagenous materials; and is thereafter treated, as by proteolytic enzymes, e.g., pepsin, to remove the antigenic ends from the collagen molecules. Such collagen, while retaining the helical structure and fiber forming properties of native collagen, lacks the native cross-links that provide native collagen with its high tensile strength and great resistance to degradation by enzyme and resorption by body fluids.

As used herein "native" or "native-type" cross-links, or cross-link sites refers to cross-links directly between amino-acid moieties that normally occur in the collagen peptide chains. Such native cross-links principally occur between lysine or hydroxylysine residues. The cross-linking "sites" are those lysine or hydroxylysine residues that have been altered into the aldehyde form and are thereby available to produce cross-links by Schiff base formation.

More specifically, the present invention comprises a method for generating native cross-links in the helical region of collagen after the non-helical ends have been cleaved by pepsin. Collagen is incubated with pyridoxal-5-phosphate and ionic copper or iron to produce collagen containing aldehyde cross-link intermediates and cross-linked collagen.

In the invention process, pure collagen that has had the non-helical antigenic ends removed by pepsin digestion, is incubated with pyridoxal 5-phosphate in the presence of either cupric or ferrous ions. Incubation is carried out at a temperature between 25° C. and 37° C. in a solution buffered to about a pH of 6.4 to 6.7%.

Incubation is continued until the lysine or hydroxylysine residues are at least partially converted into the aldehyde cross-link intermediate form in which the aldehyde group probably forms a Schiff base with pyridoxal. Pyridoxal is then removed by dialysis and cross-links can be formed upon further incubation of the collagen fibrils, or when emplaced into a subject at body temperatures. Such subsequent cross-linking occurs by a Schiff base condensation reaction.

It is therefore an object of the invention to produce native type cross-links in the helical portion of collagen.

It is another object of the invention to induce native type cross-links or cross-link sites in the helical portion of collagen by treating the collagen with pyridoxal 5-phosphate in the presence of cupric ion or ferrous ion.

It is another object of the invention to produce low-antigenic helical collagen having intermolecular cross-links directly between some of the amino acid moieties thereof.

Other objects and advantages of the invention will become apparent from a review of the drawing, subsequent specification and the claims appended hereto.

DETAILED DESCRIPTION OF THE INVENTION

Figure 1:
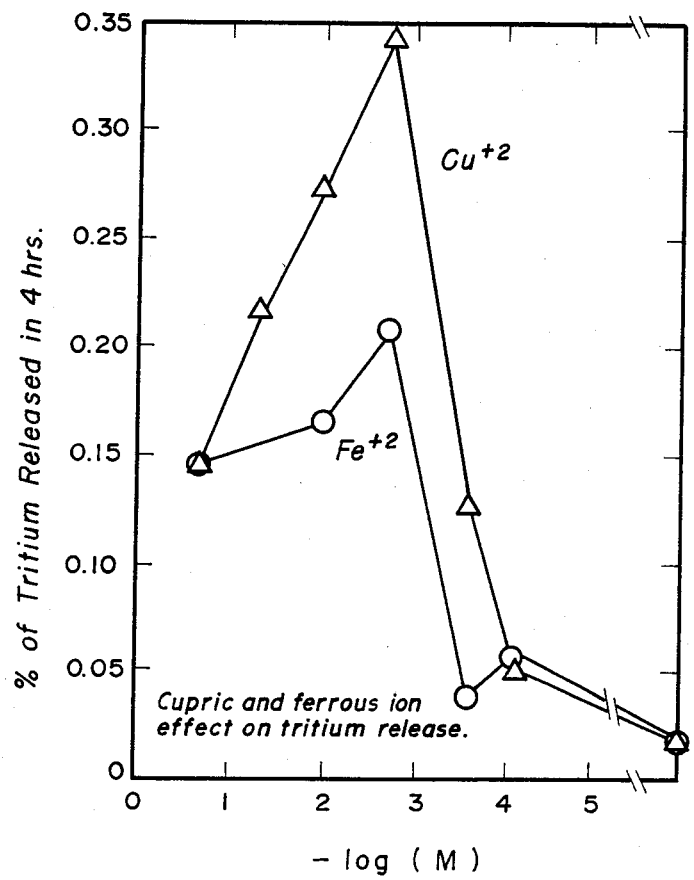
FIG. 1 is a graphical representation of the effect of concentration on the ability of cupric or ferrous ions to promote the development of cross-linking sites in radiolabeled (T-6 lysine) pepsinized collagen incubated at pH 7 in the presence of pyridoxal-5-phosphate.

Cross-links, or aldehyde cross-linking sites are produced on collagen by incubating normally uncross-linked enzyme digested collagen with pyridoxal phosphate in the presence of cupric or ferrous ions. Cross-linking production is more efficient in the presence of cupric ion, and therefore its use is preferred. Nonetheless, ferrous ion is also useful, though somewhat less (about 50%–60%) efficient.

Cross-linking is produced, or aldehyde cross-linking sites are produced, by incubating the collagen with the pyridoxal phosphate and cupric or ferrous ion at a temperature between about 25° and 37° C. The reaction mixture is maintained at a roughly neutral pH, i.e., about 6–7; ideally 6.4. Cross-link production occurs more rapidly at the upper end of the temperature limit; however, at 37° C. collagen is approaching its denaturation temperature. Therefore, it is often advantageous to carry out the incubation at somewhat lower temperatures to avoid any heat degradation of the collagen.

During the course of incubation some of the lysine, or hydroxylysine moieties in the collagen helix have their side chains converted to the corresponding aldehyde, i.e.,

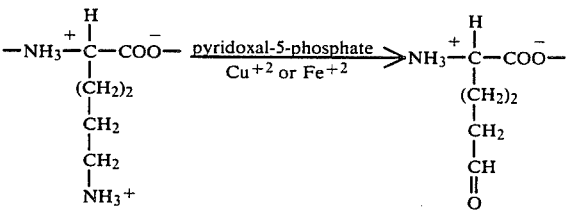

These lysyl or hydroxylysyl aldehyde residues are then capable of cross-linking with other converted lysyl or hydroxylysyl residues by a Schiff base reaction, i.e.,

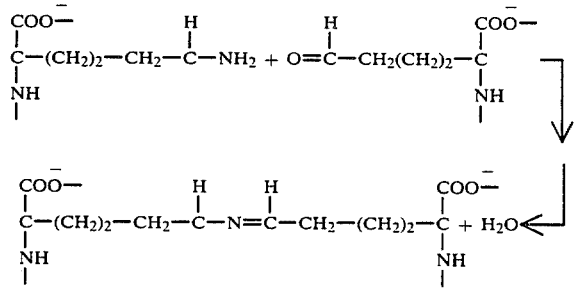

thus cross-linking adjacent collagen chains. The initial reaction product is probably a Schiff base with pyridoxal. The aldehydes are generated and pyridoxal removed by dialysis and the Schiff base cross-links are formed by reincubation.

It is to be noted that the by-product of the cross-linking reaction is water. Therefore if the lysine is previously tagged at the C-6 carbon atom by means of a suitable radio-isotope, i.e., tritium ($^3H$ or T), the water resulting from the cross-linking reaction can be detected in the reaction liquid medium. This permits use of radio-assays to assess the aldehyde generation that takes place in the invention process.

As noted above, the preferred collagen for use in the invention consists of helical collagen bundles from which the non-helical end portions have been removed. The removal of the non-helical ends can be effected in a standard procedure wherein a proteolytic enzyme, e.g., pepsin, is allowed to react with previously purified collagen, most usually obtained from a bovine source. The pepsin cleaves the non-helical ends from the collagen while the helical intermediate (and non-cross-linked) portion remains unaffected. The desired helical collagen is then separated from the digested ends and the enzyme to yield pure helical collagen. Such a product is available from commercial sources, e.g., the Collagen Corporation of Palo Alto, Calif.

In the invention process, the low-antigenic collagen is reacted with pyridoxal-5-phosphate in the presence of either cupric or ferrous ions. The reaction is carried out by incubating the collagen, pyridoxal-5-phosphate and metal ion at temperatures in the 25° to 37° C. range in an aqueous medium maintained at a pH of about 6–7. Buffering materials, such as sodium acetate, are added to the medium to maintain the desired pH during the incubation.

The presence of both pyridoxal-5-phosphate and the metal ion are vital to the production of the aldehyde intermediates and/or the cross-linked collagen.

Pyridoxal-5-phosphate has the structure:

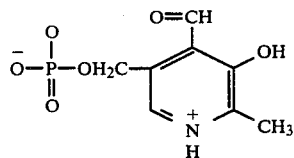

It constitutes the prosthetic group of all transaminase enzymes in biological systems. In such systems pyridoxal-5-phosphate faciliates the reversible transfer of an amino group from an α-amino acid to an α-keto acid as its primary catalytic function. In some instances enzyme bound pyridoxal-5-phosphate enters into catalytically driven decarboxylations, deaminations, racemizations, and aldol cleavages. In other instances, pyroxidol-5-phosphate enzymes catalyse reactions at the β or γ carbon atom of α-amino acids both by way of elimination or replacement of functional groups.

In any event, pyridoxal-5-phosphate is a necessary component in the cross-linking incubation. Pyridoxal-5-phosphate can be obtained from commercial sources, e.g., Calbiochem.

Although pyridoxal-5-phosphate is a known promoter for transaminations, decarboxylations, deaminations, etc., as noted above, it does not catalyze aldehyde formation when it alone is incubated with collagen. To achieve reasonable development of aldehyde cross-linking sites, it is necessary to include either copper or iron ions along with the pyroxidal during collagen incubation.

The mechanism by which the pyroxidal-5-phosphate and cupric or ferrous ion act to produce the cross-linking sites is not known, but suffice to say, an appreciable number of such sites are produced when low-antigenic collagen is incubated with pyroxidal-5-phosphate and cupric or ferrous ion under the conditions as herein set forth.

The cupric or ferrous ion may be supplied from any water soluble source of the metal. Soluble inorganic compounds, i.e., metal salts are particularly suitable for this purpose. Thus cupric sulfate or ferrous sulfate may be used to supply the metal ions. Pure salts of these metals are obtainable from any number of commercial sources.

The collagen is treated by incubation along with the pyridoxal-5-phosphate and the ionic copper or iron. The collagen is suspended in an aqueous solution and pyridoxal-5-phosphate and ionic copper or iron is added thereto. The aldehyde or cross-linking reaction most advantageously occurs when the pyridoxal-5-phosphate concentration is maintained at about 0.001 M. Ionic copper or iron concentrations are optimally maintained at about 0.002 M. The concentrations of the pyridoxal and metal ions may be varied from those noted above; however studies have shown that the production of cross-linking sites is most efficient at, or about the noted concentrations.

FIG. 1 of the drawing illustrates that the greatest production of aldehyde cross-link intermediates (as measured by tritium release) occurs when the cupric or ferrous ion concentration reaches about 0.002 M. At concentrations above or below the optimum, the rate of aldehyde production is greatly reduced. It is to be understood that lower or higher metal ion concentrations will result in aldehyde formation; however such production is less efficient. Increased incubations times would be necessary to produce the same extent of aldehyde formation as would be produced in much shorter incubation times with optimum metal ion concentrations.

Figure 2:
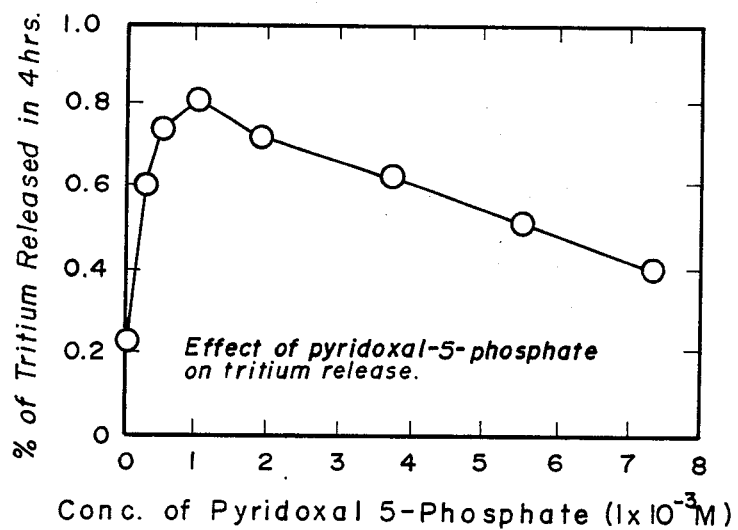
FIG. 2 is a graphical representation of the effect of the concentration of pyridoxal-5-phosphate on the production of aldehyde cross-link intermediates in radiolabeled chick calvaria collagen incubated at pH 7 along with 0.002M cupric ion.

FIG. 2 of the drawing illustrates that optimum aldehyde site production occurs when the pyridoxal-5-phosphate concentration is about 0.001 M. At lower concentrations, aldehyde production falls off very rapidly. At higher concentrations aldehyde production is also reduced; but the drop is not as drastic as in the case of lower concentrations. For efficiency, i.e., shortest incubation times, the 0.001 M concentration of pyridoxal-5-phosphate is preferred.

Figure 3:
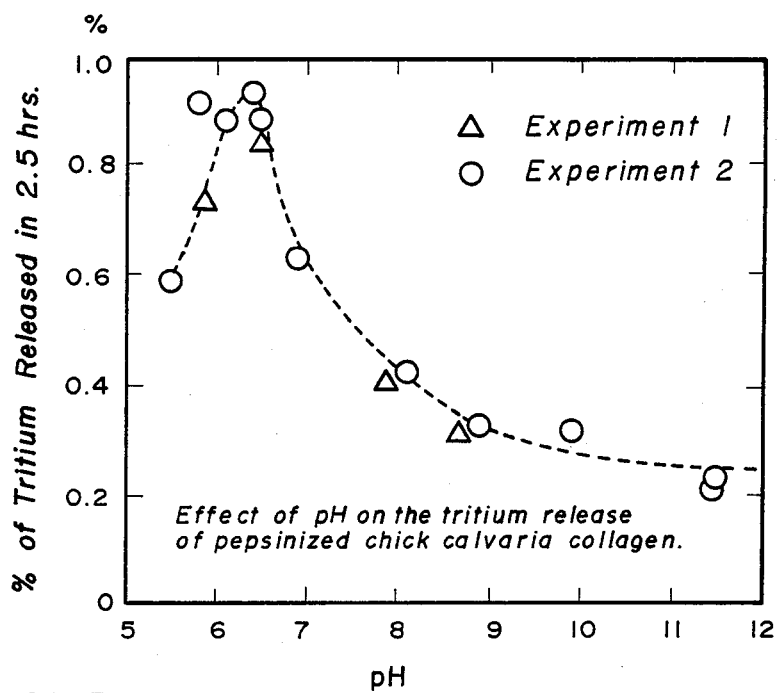
FIG. 3 is a graphical representation of the effect of pH on the production of cross-links and/or cross-linking sites in radiolabeled pepsinized chick calveria collagen when incubated with $CuSO_4$ and pyridoxal-5-phosphate.

The pH at which incubation takes place also affects the rate of aldehyde cross-link intermediate formation. In a series of experiments, pepsinized chick calvaria collagen was incubated at 37° C. for 2.5 hours with $CuSO_4$ (0.002 M) and pyridoxal-5-phosphate (0.001 M) in 0.1 M sodium acetate. The pH of the incubation mixture was changed in each successive incubation sample from a low of about 5.5 up to a high of 11.5 by the addition of HCl or NaOH as necessary. FIG. 3 of the drawing summarizes the results. As will be noted in the Figure, maximum aldehyde production took place at a pH of about 6.4. At pH's much below or above 6.4, formation was reduced. Therefore, it is desirable to conduct the incubation at a pH of about 6.4 or as close thereto as possible.

Incubation temperatures also influence the rate of cross-linking and/or aldehyde production. Generally speaking cross-linking and/or aldehyde production remains quite slow at temperatures below about 25° C. Above 25° C., the production rate increases quite rapidly; and continues to increase at least to 37° C. Since collagen begins to denature above 37° C., it is not desirable to use higher temperatures.

Figure 4:
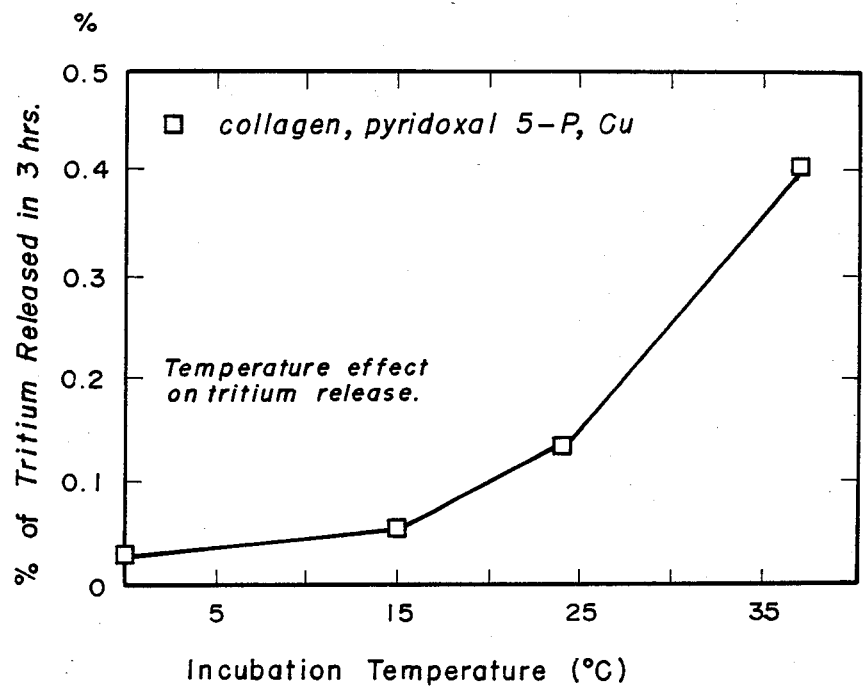
FIG. 4 is a graphical representation of the effect of temperature on the production of cross-links and/or cross-linking sites in radiolabeled chick calvaria collagen incubated at pH 7 with $CuSO_4$ and pyridoxal-5-phosphate.

FIG. 4 of the drawing illustrates the effect of incubation temperature upon aldehyde formation. In FIG. 4, samples of T-6 lysine radiolabelled pepsinized chick calvaria collagen were incubated for 3 hours in the presence of 0.002 M $CuSO_4$, and 0.001 M pyridoxal-5- phosphate at various temperatures. The results, as measured by tritium release from the T-6 lysine are shown in the plot. The increasing rate of aldehyde production can be readily noted as incubation temperatures increased to 37° C. from 25° C.

The components must be incubated (under the conditions noted above) for considerable periods of time in order to create a suitable population of aldehyde intermediates and cross-links in collagen. Incubation times of 8 hours and up to perhaps 24 hours, or more, are required to produce an average of two cross-links per molecule. Although the number of cross-links produced per molecule may seem small, this low number is sufficient to significantly increase the collagen's resistance to degradation by collagenase. The treated collagen also becomes less soluble in acetic acid; which is a further measure of resistance to resorption in a tissue environment.

To generate cross-links it is often useful to conduct a first incubation, and then follow with dialysis to remove pyridoxal and minerals and then do a second incubation. It is believed that a relatively brief, e.g. 8 hours, first incubation period serves to produce aldehydes as noted above. This collagen will then cross-link upon additional incubation after dialysis in the absence of the metal ion and pyridoxal-5-phosphate. Studies have shown that such double incubated collagen tends to have more resistance to collagenase and less solubility after a first relatively short incubation time with the metal ion and pyridoxal, and a second longer, e.g., 24 hours incubation period after the metal ion and pyridoxal have been removed.

To illustrate the effect of a first incubation followed by a second incubation, in several studies pepsinized radio-labelled chick calvaria collagen was first incubated at 37° C. with 0.002M ferrous sulfate and 0.001 M pyridoxal-5-phosphate for various periods of time from 4 to 48 hours. The samples were then dialyzed against 0.5 M acetic acid and phosphate buffered saline to remove the ferrous sulfate and pyridoxal and redialyzed to initial incubation conditions. The collagen samples were then subsequently incubated at 37° C. with no additions to the incubation solution. The second incubations were carried out for either 24 hours or 48 hours. As a control a second set of samples were incubated two times for the same periods and at the same temperatures. However, the incubations were carried out in the absence of both $FeSO_4$ and pyridoxal.

Figure 5:
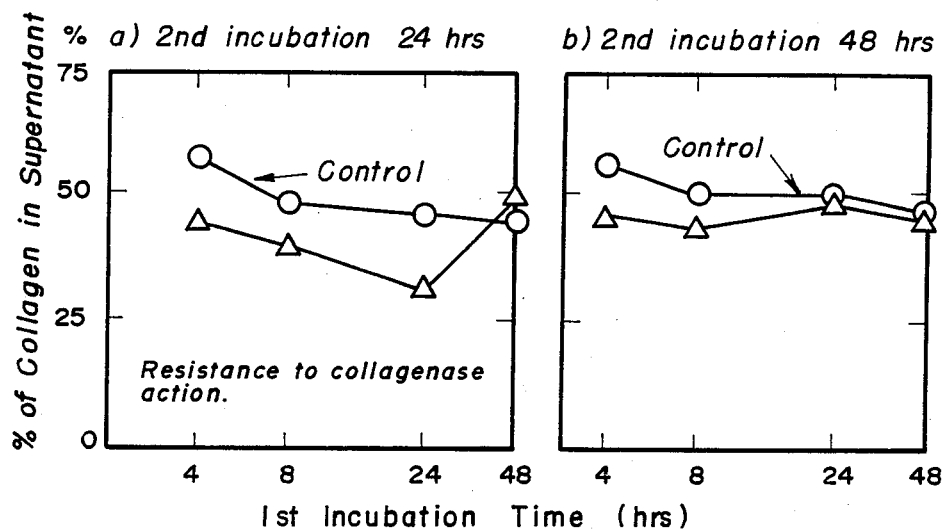
FIG. 5 is a graphical representation of test results wherein pepsinized collagen underwent a first incubation in the presence of ferrous ion and pyridoxal, followed by dialysis to remove pyridoxal and ferrous ion, followed by a second incubation of fibrils to promote cross-link formation at sites where aldehydes were generated in the first incubation. The change in resistance to enzymatic digestion as compared with a control was then determined.

To test for the collagen's resistance to degradation, one group of samples was lyophilized and then digested by bacterial collagenase at 37° C. for 2 hours. The amount of collagen found in the supernatant liquid was a measure of the collagen's resistance to enzyme digestion. FIG. 5 of the drawing indicates the results. As will be noted therefrom, the ferrous ion and pyridoxal treated collagen demonstrated improved resistance to enzyme digestion where the first digestion with the ferrous ion and pyridoxal continued for up to 24 hours.

Figure 6:
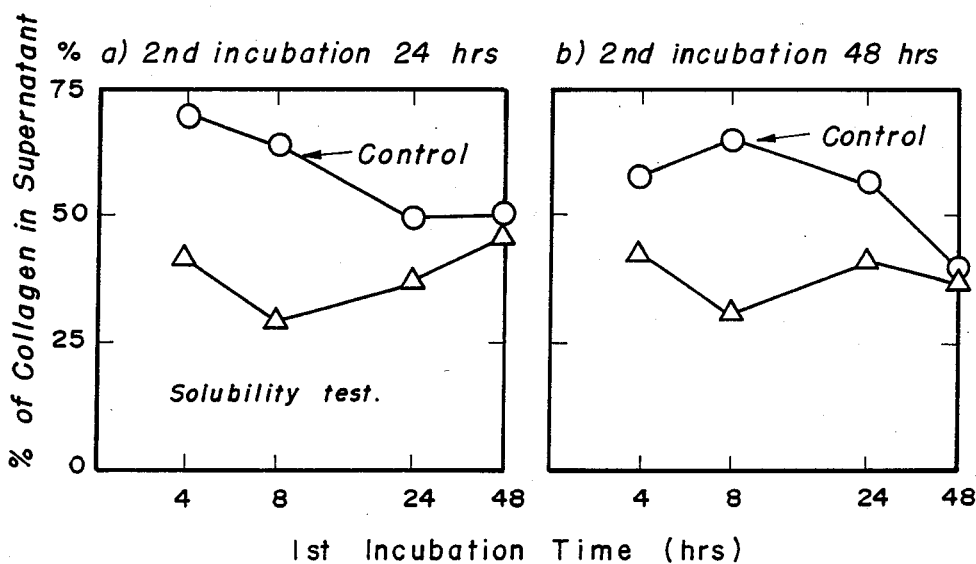
FIG. 6 is a graphical representation of pepsinized collagen and a control incubated under the same conditions as noted in FIG. 5. The change in resistance to dissolution by 0.5M acetic acid as compared with the control was then determined.

In a second test pepsinized chick calvaria collagen was incubated under the same conditions and for the same time periods as in the test noted immediately above. However, in these tests, the incubated product was lyophilized and then extracted with 0.5 M acetic acid at 23° C. for 2 hours. The amount of collagen appearing in the extraction liquid was a measure of the treated collagen's solubility. FIG. 6 of the drawing illustrates the results. It shows that collagen incubated for up to 24 hours with ferrous ion and pyridoxal demonstrates considerably less solubility than does collagen incubated in the absence of metal ion and pyridoxal.

In all instances, the metal ion and pyridoxal are removed from the collagen after the incubation is terminated. Removal can be effected by dialyzing the reaction mixture. Thus the metal ion and pyridoxal can be separated from the collagen by dialyzing against a suitable salt or acid solution, e.g., 0.5 M acetic acid. Upon dialysis the metal ions and pyridoxal-5-phosphate diffuse across the membrane barrier while the treated collagen remains behind. Aldehydes that are bound to pyridoxal are regenerated and able to cross-link. The material can then be reincubated to promote cross-link formation. The suspension of collagen with its induced cross-links and/or aldehyde intermediates (cross-linking sites) is then available for use.

It will be understood that cross-linking occurs either during the second incubation after dialysis or when the collagen is emplaced within the tissues of a patient. Until such use, the treated collagen may be refrigerated to prevent further cross-linking.

What is claimed is:

1. An in vitro method for increasing the resistance to degradation of a proteolytic enzyme treated and purified collagen product comprising incubating said proteolytic enzyme treated collagen product with pyridoxal 5-phosphate and an ionic metal selected from the group consisting of copper and iron.

2. The method of claim 1 wherein incubation is undertaken at a temperature between 25° C. and 37° C.

3. The method of claims 1 wherein the incubation is undertaken at a pH of about 6–7.

4. The method of claim 3 wherein the pH is 6.4.

5. The method of claim 1 wherein incubation continues for a period of from 2 to 24 hours.

6. The method of claim 5 wherein the reaction materials are dialysed following incubation to remove the pyridoxal-5-phosphate and the ionic metal, the collagen is thereafter recovered, and incubated a second time to form cross-links.

7. An in vitro method for producing native cross-linking sites on a proteolytic enzyme treated and purified collagen product comprising incubating said collagen product with pyridoxal-5-phosphate and metal ion selected from the group consisting of copper and iron.

8. The method of claim 7 wherein the ionic copper is in the +2 oxidation state.

9. The method of claim 7 wherein the ionic iron is in the +2 oxidation state.

10. An in vitro method for producing cross-links in a proteolytic enzyme treated and purified collagen product comprising incubating said collagen product with pyridoxal-5-phosphate and an ionic metal selected from the group consisting of copper and iron, thereafter removing the pyridoxal-5-phosphate and ionic metal from the incubated collagen product, and then reincubating the collagen product alone until cross-links are formed.

11. The method of claim 10 wherein the Pyridoxal-5-phosphate is present in a concentration of about 0.001 molar.

12. The method of claim 10 wherein the ionic metal is present in a concentration of about 0.002 molar.

13. The method of claim 10 wherein the incubations are carried at a temperature of between 25° and 37° C., and at a pH of about 6–7.

14. An in vitro method for producing cross-linking sites in a product consisting essentially of the central helical portions of collagen comprising incubating said collagen product with pyrodoxal-5-phosphate and metal ion selected from the group consisting of cupric copper and ferrous iron, and continuing the incubation until at least some of the lysyl and hydroxylysyl moieties in the collagen are converted into the aldehyde functional form.

15. The method of claim 14, wherein the incubation is carried out at a temperature between 25°0 C. and 37° C., and at a pH of about 6–7.

16. The method of claim 14 wherein the metal ion is present in a concentration of about 0.002 and the pyridoxal-5-phosphate is present in a concentration of about 0.002 M.

17. A collagen product consisting essentially of the central helical portion of native collagen and having cross-links of the native type produced by incubating reaction mixture consisting essentially of said collagen with pyridoxal-5-phosphate and either cupric copper ion or ferrous iron ion.

18. A collagen product consisting essentially of the central helical portion of native collagen and having cross-linking sites produced by incubating reaction mixture consisting essentially of said collagen with pyridoxal-5-phosphate and either cupric copper ion or ferrous iron ion.

* * * * *